(12) United States Patent
Wiklof et al.

(10) Patent No.: US 6,246,326 B1
(45) Date of Patent: Jun. 12, 2001

(54) PERFORMANCE OPTIMIZED SMART LABEL PRINTER

(75) Inventors: Christopher A. Wiklof, Everett, WA (US); Jan-Erik Larsson, Vastra Frolunda (SE)

(73) Assignee: Intermec IP Corp., Woodland Hills, CA (US)

(*) Notice: Subject to any disclaimer, the term of this patent is extended or adjusted under 35 U.S.C. 154(b) by 0 days.

(21) Appl. No.: 09/305,393

(22) Filed: May 5, 1999

(51) Int. Cl.[7] .................................................. G08B 23/00
(52) U.S. Cl. .............................................................. 340/572.1
(58) Field of Search ............................... 340/572.1, 572.4, 340/572.5, 551; 29/827; 156/177

(56) References Cited

U.S. PATENT DOCUMENTS

| | | | |
|---|---|---|---|
| 4,862,160 | * | 8/1989 | Ekchian et al. ............... 340/572.1 |
| 4,900,386 | * | 2/1990 | Richter-Jörsensen ............ 340/572.1 |
| 5,671,146 | * | 9/1997 | Windel et al. ................. 340/572.1 |
| 5,838,253 | * | 11/1998 | Wurz et al. .................... 340/572.1 |

* cited by examiner

Primary Examiner—Daniel J. Wu
Assistant Examiner—John Tweel, Jr.
(74) Attorney, Agent, or Firm—O'Melveny & Myers LLP

(57) ABSTRACT

A smart label printing system and method for printing smart labels is provided. The smart label printing system enables the expedited programming of the RFID tag component of the smart label so that delays due to the unequal time between printing the exterior of the smart label and encoding the smart label are avoided. The smart label printing system comprises a thermal printing unit to print the exterior of the smart label as well as an RF driver to program the RFID tag embedded inside the smart label. Methods are provided to increase overall throughput speed of the smart label, including prioritizing RFID tag data over exterior printing data in a RAM, compressing RFID tag data sent from a host computer, pre-loading fixed and regularly varying data, and predicting variable unknown data through the use of an artificial intelligence model. In addition, methods for uniquely arranging programming antennas and media pathways which act to speed up overall programming speed are also provided.

45 Claims, 6 Drawing Sheets

PERFORMANCE OPTIMIZED SMART LABEL PRINTER

BACKGROUND OF THE INVENTION

1. Field of the Invention

The present invention relates to the printing of labels and more specifically to the printing and encoding of labels containing radio frequency identification (RFID) technology, herein referred to as smart labels.

2. Description of Related Art

The automatic identification industry has undergone many recent developments with respect to the use of transponders to track and identify objects. RFID systems are well known in the art, and the basic RFID system consists of an antenna, a transceiver, and a transponder (RFID tag). The RFID tag is encoded with information for easy retrieval. The antenna emits radio signals to activate the RFID tag so that the tag can be read, and acts as a conduit between the tag and the transceiver. When the antenna is packaged with the transceiver, an interrogator is created. The interrogator is used to read the information from the RFID tag when necessary. The interrogator emits radio waves in various ranges, depending upon the power output of the interrogator as well as the range of the RFID tag. When an RFID tag passes through the electromagnetic zone, it detects the interrogator's activation signal through an antenna in the RFID tag. The antenna senses the interrogating field and acts as the method of transmitting a response to interrogation. The interrogator receives and decodes the data encoded in the RFID tag's integrated circuit and the data is passed to a host computer for processing.

A so-called smart label is a development from RFID systems that incorporates an integrated circuit coupled to an antenna with read/write capability used to store data for identification and tracking of articles. The resulting RFID tag is small enough to be placed into a standard adhesive label without appreciably affecting the thickness of the label. Thus, the smart label can be used in many applications such as express parcel delivery, airline baggage handling and security verification. The smart label offers advantages over standard labels by providing the ability to rewrite data into the label, read the label without line-of-sight restriction, and longer read range.

Conventional prior art label printers are capable of printing labels in a fast, efficient way. However, with the development of smart labels, there exists a need for label printers that can not only print visible indicia such as bar code symbols, addresses, logos, etc., but that also have the capability to read and write to RFID tags. Optimally, the interrogating functions would be carried out in the same time frame as the exterior printing of the label. Unfortunately, no prior art printer has effectively been able to accomplish this.

Prior art label printers generally comprise thermal printers, which use a thermal printing head for the transfer of indicia to the labels. The thermal print head is generally connected electronically to a computer processor by way of a control circuit. The thermal print head includes at least one electrically-resistive thermal print element that is maintained in contact against an opposing pressure member, with the thermal print element being capable of producing heat upon the application of an electronic signal thereto. A thermal print medium, such as a specially-coated paper in sheet or strip form, is interposed between the thermal print head and the pressure member, whereby the pressure member maintains the thermal print medium in contact with the thermal print element. When the thermal print medium is at ambient temperature, the coating is inactive; however, when the temperature of the thermal print medium is raised to or above a certain threshold temperature, the coating undergoes a chemical reaction and is exposed. Thus, when an electrical signal is applied to the thermal print element, the heat produced thereby raises the temperature of the thermal print medium above a threshold temperature so as to expose at least a portion of the coating, whereby a character or a portion of a character is printed. Thermal printers have many inherent advantages over other types of printers including the production of clearly printed images at high output rates, quiet and clean operation, and relatively small size.

Prototype printers that attempt to combine thermal printing technology with RFID interrogating technology are deficient in that the write time to the RFID tag takes substantially longer than the printing time to the label.

It is therefore an object of this invention to provide a method and apparatus to increase the speed required to program the RFID tag portion of a smart label.

It is a further object of this invention to provide a method and apparatus to increase the speed of the interrogating portion of a smart label relative to the exterior printing speed of the smart label so that the two functions are completed in a similar time frame.

It is still a further object of this invention to provide a method and apparatus to increase the overall throughput speed of a smart label.

SUMMARY OF THE INVENTION

In accordance with the teachings of the present invention, a performance optimized smart label printer is provided to increase the speed of encoding RFID tags to coincide with the printing of visible indicia on the exterior of the label. The present invention includes a standard thermal label printer equipped with the capability to read and write to RFID tags. The present invention further comprises several methods to speed up the delivery of the printing and encoding of a smart label.

The label printing system of the present invention incorporates a thermal printing unit with an RF driver to produce smart labels. The smart label printer includes a central processing unit that accesses memory and commands from various locations, and transmits digital signals to and from the thermal printing unit and the RF driver. An artificial intelligence model is also included which can be used to predict incomplete RFID tag data.

The delivery of the smart label is optimized by incorporating various methods of manipulating data to be loaded into the printing system. For example, RFID tag data can be placed in front of printing data, or prepended, so that the encoding of the RFID tag can begin at the earliest possible time, thereby increasing throughput of each label. Also, RFID tag data can be compressed down from 8 bits per character so that fewer data blocks are necessary. In addition, the communication delay associated with the input of data to the RFID tag can largely be eliminated by pre-loading fixed and regularly varying data ranges, such as incrementing serial numbers, into the printer so that the pre-loaded data can be emptied from the printer memory, enabling memory availability for varying data to be sent from a host computer. Furthermore, the speed of printing and encoding smart labels can be increased by using an artificial intelligence model to predict varying data that is unavailable at the time of printing.

Another feature of the present invention which will increase overall throughput speed is the unique arrangement of antennas used to program the transponders. When the media has to move too fast for the data manipulation methods to compensate, data may be written to the transponder over an extended distance or by several antennas at the same location. Finally, throughput speed can also be increased by creating additional residence time for the RFID tag antennas by extending the pathway between the label origin and the print head.

A more complete understanding of the performance optimized smart label printer will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention satisfies the need for a method and apparatus to increase the speed at which smart labels are printed and programmed. This is accomplished by introducing a method of increasing RFID tag programming speed to match the standard speed of printing the exterior of a smart label. In the description that follows, like element numerals are used to describe like elements in one or more of the figures.

Figure 1:
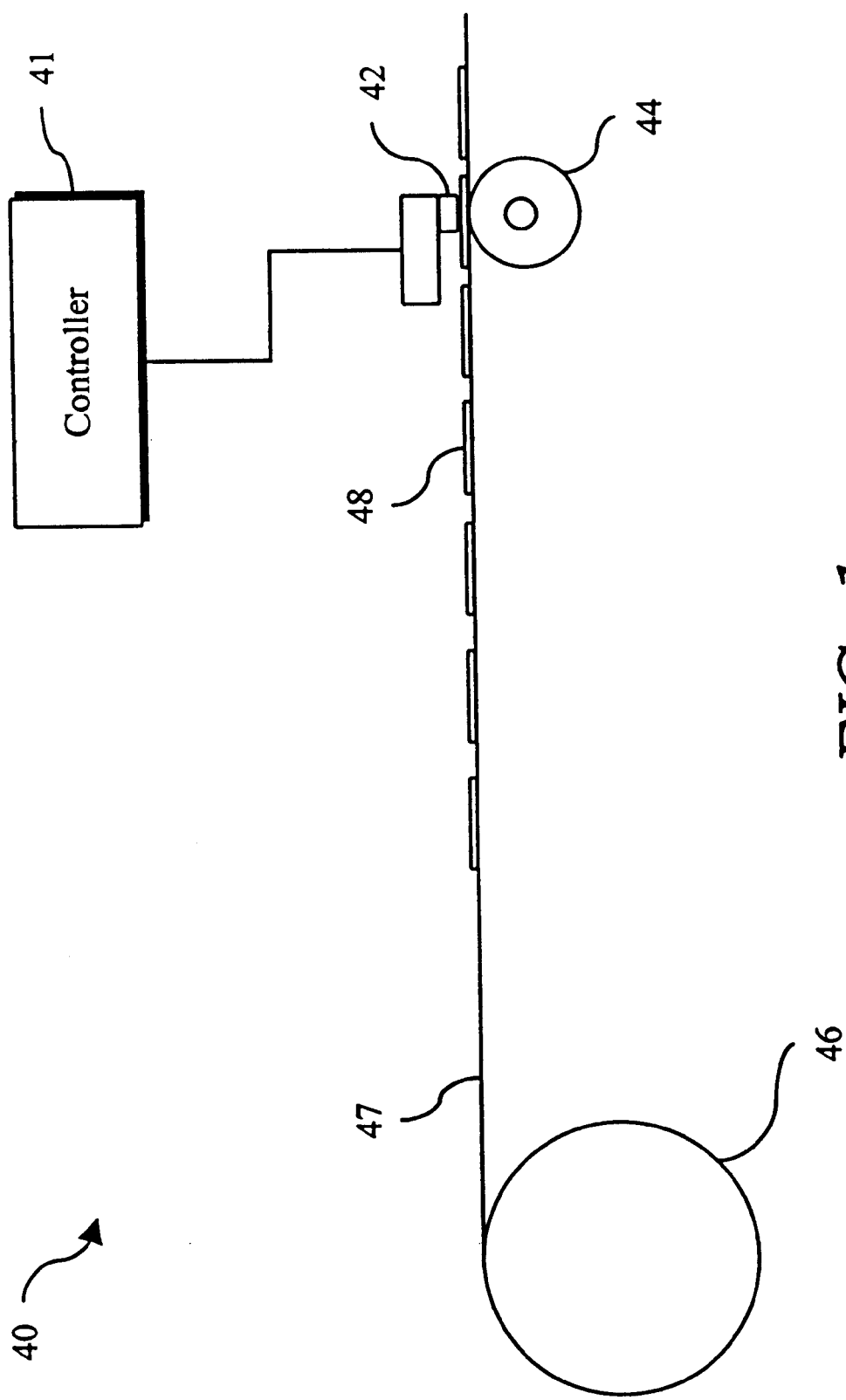
FIG. 1 is a side view of a thermal printing unit of the present invention.

The smart label printer of the present invention is configured to produce smart labels by both encoding the RFID tags embedded inside of the smart label as well as printing the exterior of the smart label. FIG. 1 illustrates the exterior printing function of the smart label printer by showing thermal printing unit 40. In FIG. 1, the print media roll 46 includes a backing 47 and smart labels 48 that are attached to the backing 47 with an adhesive. As the smart labels 48 pass between the thermal print head 42 and the platen roller 44, a printer controller 41 activates selected print elements on the print head 42 to pass current through the selected print elements. The current induces resistive heating in the selected print elements, thereby heating a local region of a ribbon (not shown) and smart label 48. As the ribbon is heated, thermally sensitive ink on the ribbon transfers to the smart label 48, producing a dark spot or "pixel." The darkness of the pixel corresponds to the amount of current passing through the print element and the time during which the printed region is adjacent to the print element. Assuming the printed region is in place for a constant period, the controller 41 can control the darkness of each pixel by controlling the current to the print elements, thereby constructing an image from the pixels.

Figure 2:
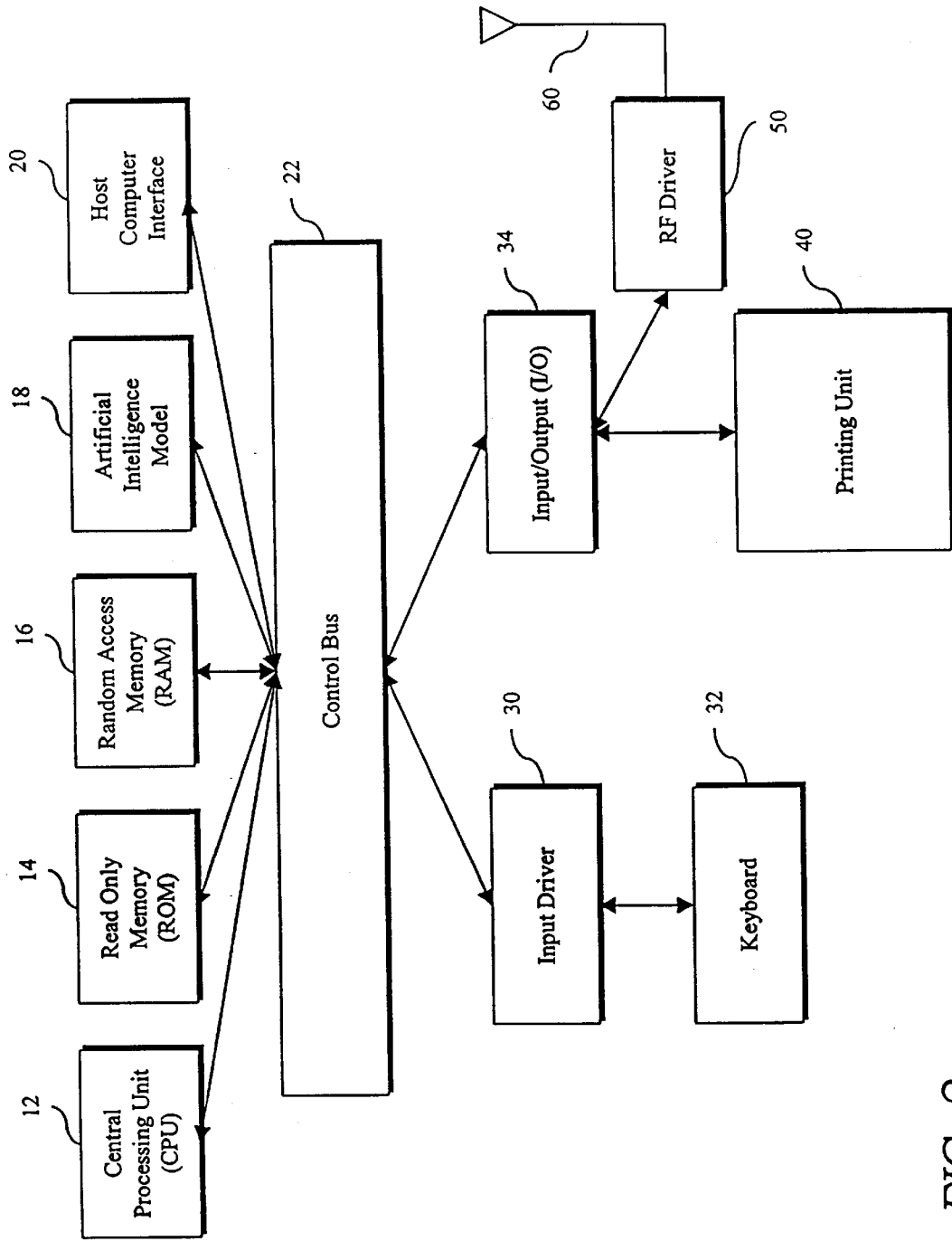
FIG. 2 is a block diagram of the smart label printer of the present invention.

Referring now to FIG. 2, a block diagram of the smart label printer 10 is shown. The smart label printer 10 includes a central processing unit (CPU) 12, a read only memory (ROM) 14, a random access memory (RAM) 16, an artificial intelligence model 18, a host computer interface 20, a data input driver 30 and an input/output (I/O) device 34. Each of the functional elements of the smart label printer 10 are coupled together by a bidirectional data and control bus 22, over which data and control messages are transmitted. The CPU 12 controls the operation of the smart label printer 10, and may be provided by a conventional microprocessor. The RAM 16 provides temporary data storage for operation of the CPU 12, and the ROM 14 provides for non-volatile storage of an instruction set that can be sequentially executed by the CPU 12 to control the overall operation of the smart label printer 10. The artificial intelligence model 18 inspects RFID tag data to determine developing patterns. This enables the input of information to the RFID tags based on prediction, which is needed to implement remaining and/or future programming functions. The host computer interface 20 is used to receive control commands and data transmitted from an external host computer (not shown). The host computer provides smart label data to the label printer 10. Finally, the data input driver 30 processes input signals from keyboard 32.

The I/O device 34 controls communications between the smart label printer 10 and the RF driver 50 and the printing unit 40. The I/O device 34 is coupled to the RF driver 50 which includes a radio frequency modulator that permits digital signals to be communicated through the antenna 60 to/from the RFID tags via an RF communication channel. The RF driver 50 can also be used to communicate to/from a local area network (LAN). The I/O device 34 is also coupled to the printing unit 40 which includes a controller 41 and thermal print head 42 as described above.

The smart labels that are produced using the smart label printer 10 contain an embedded RFID tag for information storage in addition to the information printed on their exterior. A typical RFID tag used in the smart label (Texas Instruments TI Tag-It) has the following characteristics:

| Frequency | 13.56 MHz, +/−100 PPM |
|---|---|
| Block Read Time | 17 mS |
| Block Write Time | 110 mS (Average) |
| Data Verification Time | 17 mS |
| Data Capacity | 8 Blocks at 4 Bytes/Block |
| Tag Size | 1.75" × 1.75" (Width × Length) |

Using the following formula we can calculate the print speed necessary to write to the transponders:

$$S=L/NT$$

S=maximum speed to write to blocks
L=write length distance over label with minimum 50% occlusion)
N=number of blocks written to
T=write time per block

| Number Of Blocks Written | Maximum Media Speed (ips) |
|---|---|
| 1 | 15.0 |
| 2 | 7.5 |
| 3 | 5.0 |

-continued

| Number Of Blocks Written | Maximum Media Speed (ips) |
|---|---|
| 4 | 3.7 |
| 5 | 3.0 |
| 6 | 2.5 |
| 7 | 2.1 |
| 8 | 1.9 |

Exterior printing of the smart label can be accomplished in the range of 8–12 inches per second (ips); thus, when an RFID tag requires more than 1 block of data to be transferred, the throughput of smart labels is not being optimized. In order to increase the speed at which RFID tags are programmed, either the write time per block must be decreased, the number of blocks written to must be decreased (if more than 1 is required), or the write length must be increased. Some or all of these objectives can be met through data manipulation as well as other techniques which will be described below.

Data manipulation to speed up overall RFID tag programming time can be accomplished by several methods either alone or in combination. A first method involves the prioritization of label data. By organizing the data in such a way that the RFID tag data is given priority over the exterior printing data, write time to the RFID tag can be reduced with respect to the printing of the exterior of the smart label. The RFID tag data is prepended to the exterior printing data in the RAM 16 and is sent through the I/O device 34 to the RF driver 50 prior to the exterior printing data being sent to the thermal printing unit 40. While this method does not decrease the write time to the RFID tag per se, it does increase the throughput speed of the smart label because the RFID tag data precedes the exterior printing data, getting a head start on the information exchange.

A second method of increasing write speed is to decrease the number of blocks being written. As seen in the charts above, the fewer blocks required to be written translates to an increase in the throughput speed of the media. A decrease in blocks written is accomplished by compressing the RFID tag data over standard American Standard Code for Information Interchange (ASCII) format. The ASCII format is a binary code comprising 128 alphanumeric and control characters, each encoded with 7 bits. This allows the encoding of the RFID tag in fewer than the 8 bits per character format that the data is received in. The overall effect is the elimination of write cycles because there are fewer blocks required for the data. Code formats including lower ASCII (7 bits), cap alphanumeric (6 bits), numeric only (4 bits), and others requiring less than 8 bits per character would achieve a similar result.

A third method for improving throughput speed of the smart label is the elimination of communication delays between the label printer and the host computer through data distribution. RFID tag data can be supplied to each label printer with a data range. The host computer will give a command defining a format to print as well as field values (characters). The data in these field values will either be fixed, variable, or variable in a regular way (incrementing numbers). Because the data ranges sent to the printer are limited by available bandwidth, certain fixed (static) and predictable data ranges can be preloaded into the printer to speed up the process. During operation, the label printer empties its data range and reports to the host computer for the variable (dynamic) data. Because the available data range is limited by bandwidth, this method saves time because the printer can empty its pre-loaded data range of known data and report to the host computer for the variable data rather than waiting for all data to be transmitted at once. An illustration of the advantage of using this method is a line of smart labels that includes simple incrementing serial numbers as well as other variable data. The serial numbers can be pre-loaded into the printer so that the data range can be emptied for the variable data sent by the host computer. Thus, throughput speed is increased because portions of the RFID tag data can be encoded before the labels reach the print head.

Associated with the method of data distribution is a method for predicting RFID tag data based on past patterns. Historical data of the RFID tags is placed into memory and the artificial intelligence model 18 uses developing patterns to predict current data prior to actual receipt of the data. This is possible due to the fact that RFID tags are programmed in batches (1 of 20, 2 of 20, etc.). By being able to predict the label data, throughput speed is improved because the smart label printer 10 does not have to wait for certain unknown information before sending the RFID tag data to the RF driver 50. Rather, the artificial intelligence predicts what the data will be based on previous tag data and the predicted data is sent to the RFID tags. Once the actual information is received, the accuracy of the predicted data is verified. The entire process does nothing to slow down the throughput of the smart labels and, at worst, throughput speed is the same without the data prediction and verification process. This is due to the fact that if the prediction is incorrect, the correct data is simply written to the tag, resulting in no extra time since the printer would have had to wait for the data to be transmitted from the host computer in the first place. On the other hand, if the prediction is correct, the throughput of the smart labels proceeds at an accelerated rate.

Figure 3:
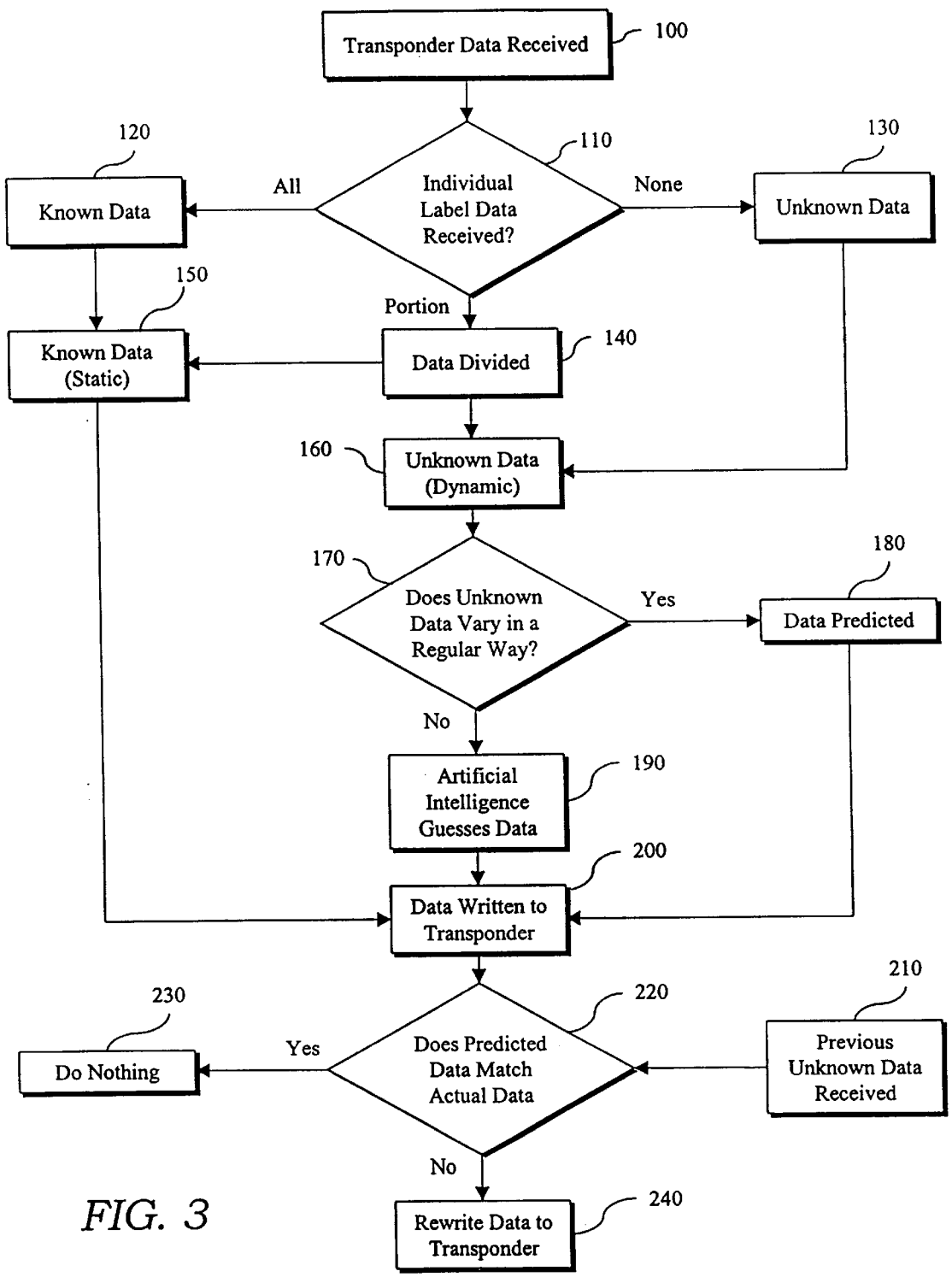
FIG. 3 is a flow chart illustrating the use of data manipulation to increase overall print speed.

These concepts of data manipulation and how they are implemented are illustrated in the flow diagram shown in FIG. 3, with reference to the block diagram of FIG. 2. Initially, at step 100, the data for the RFID tag is transmitted from the host computer to the smart label printer 10 via the host computer interface 20. At step 110, it is then determined whether all of the information needed to program the RFID tag is received. Three outcomes are possible for step 110. First, if all of the data for the RFID tags is present, the data is sent to the I/O device 34 where it is prepended to the data to be sent to the thermal printing unit 40 for exterior printing of the smart label. This process is represented in the flow chart as step 120. Thus, the static data can proceed quickly to the RF driver 50 to be programmed into the RFID tag in step 200. Second, if only a portion of the data for the RFID tag is received, the data is divided in step 140. Known, or static, data is sent to step 150 to join the static data of step 120 that is immediately sent to the programmer; unknown, or dynamic, data, represented by step 160, is predicted. Third, if none of the data is received, the unknown data, represented by step 130, is also predicted. Rather than wait for the unknown data represented by steps 130 and 160 to be transmitted by the host computer, it is determined in step 170 whether the data for the tag varies in a regular way based on previous RFID tag data. If so, the data is predicted in step 180 and sent to the RF driver 50 to be programmed into the RFID tag in step 200. For example, if successive groups of five smart labels are to be printed which are incrementing or decrementing by the same number of units (1/5, 2/5, etc.), once the information for the first is sent through, the rest will vary in a regular way and can thus be easily predicted. If the data does not vary in a regular way, the artificial intelligence model 18 predicts what the data will be based on a historical perspective of RFID tag data in step 190. This data is then also sent to be programmed to the RFID tag in step 200. Once the unknown data is received by the smart label printer 10 in step 210, the predicted data is verified for accuracy in step 220. If the data is correct, nothing is done (step 230). If the data is incorrect, the correct data is written to the RFID tag in step 240.

Figure 4:
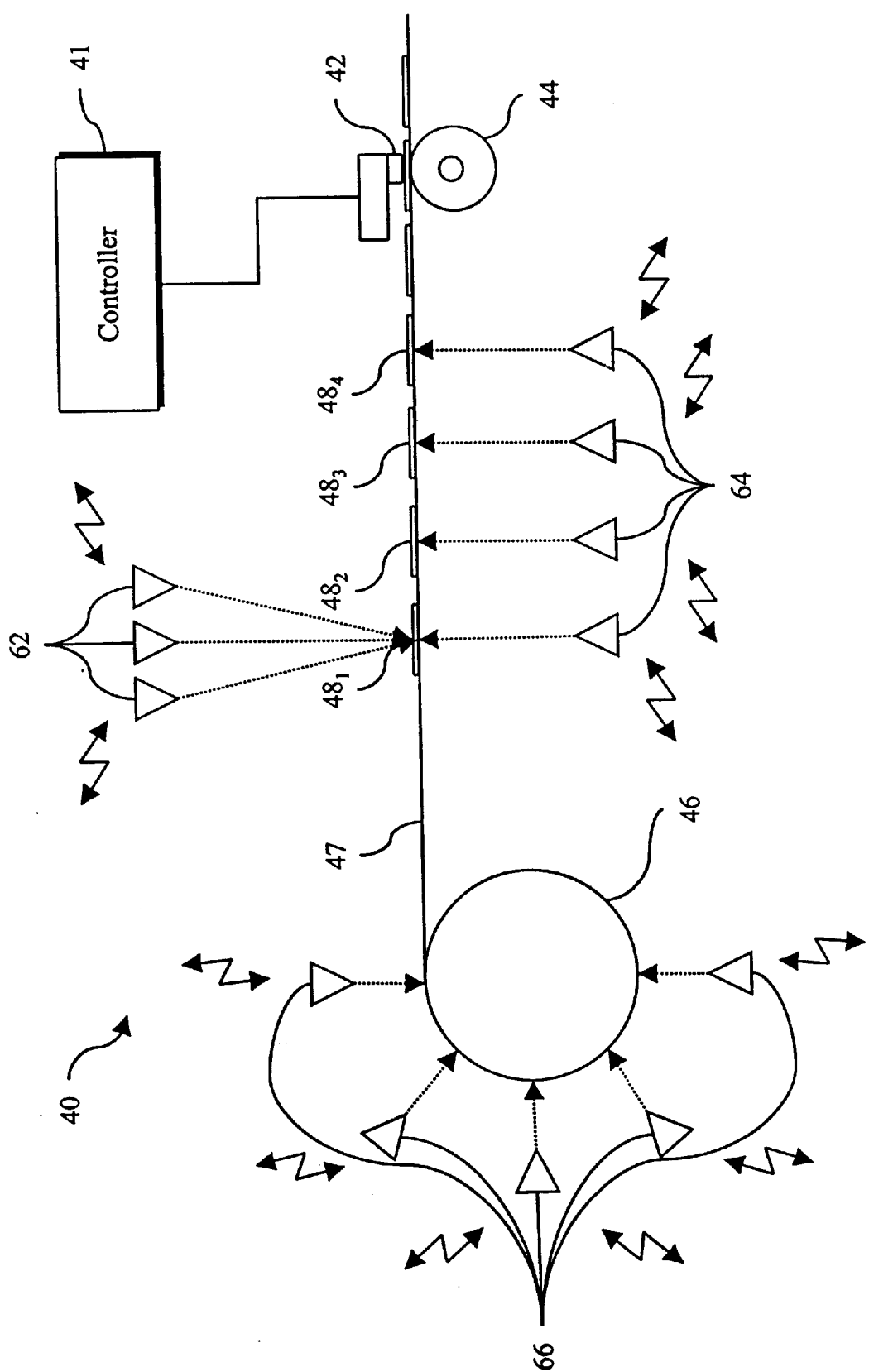
FIG. 4 is an alternate embodiment of the thermal printing unit shown in FIG. 1, including several arrangements of antennas for writing to the RFID tags.

In addition to, or in place of, the methods of data manipulation described above, throughput of the smart labels can be accelerated by optimally arranging antennas used for writing to the transponders. In some cases, for example, the media has to move too fast for the data manipulation techniques to increase the programming speed enough to match the speed of the exterior printing of the labels. In these situations, the number of antennas used for programming the RFID tags can be increased and positioned over a greater distance. This effectively decreases the number of blocks written to, increasing programming speed. Thus, if six blocks need to be written but the time dictated by the print speed only allows for the writing of two blocks, three antennas can be used sequentially, each antenna writing two blocks. Moreover, by synchronizing signals between antennas, the integrated circuit in the RFID tag remains energized and wake-up time is avoided. Synchronization is also important because the broadcast of carrier waves by the antennas must be limited to a certain boundary to avoid interference. Thus, while data should not be sent while a tag is crossing a boundary line, the RFID tag can remain energized, allowing the next synchronized antenna to immediately begin writing, eliminating any lag time. Alternatively, one of the sequentially aligned antennas can be used to wake-up the RFID tag while the next in line begins writing to the tag. This also speeds up the overall process. These concepts are illustrated in FIG. 4, where the grouping of antennas 62 write to smart label 48$_1$, in a sequential manner. Furthermore, antennas can be placed either upstream of the print head 42 for pre-writing, downstream of the print head 42 for post-writing, or at the same location as the print head 42, embedded in or adhered to the print head 42 or platen roller 44. In addition, several tags 48$_1$–48$_4$ can be written to at once using this arrangement as illustrated in FIG. 4 by the grouping of antennas 64. This encoding process is possible because either each tag will have an individual address built into its protocol, or the writing range of each antenna will be sufficiently limited to remove the possibility of interference. Therefore, several antennas can be arranged in a line equidistant from one another, writing to several RFID tags as one smart label is being printed as shown in FIG. 4. As each smart label 48 passes through the line of antennas 64, the corresponding RFID tag embedded therein will be encoded. For RFID tags requiring a limited number of data blocks, a single antenna can encode a single smart label 48. For RFID tags requiring a greater number of data blocks, the smart label 48 can be encoded sequentially as discussed above. Finally, when RFID tag identification numbers change in a predictable way (increment, decrement, etc.), antennas may be arrayed around the roll of label stock and pre-loaded data may be written to the RFID tags as illustrated by the grouping of antennas 66 in FIG. 4.

Figure 5:
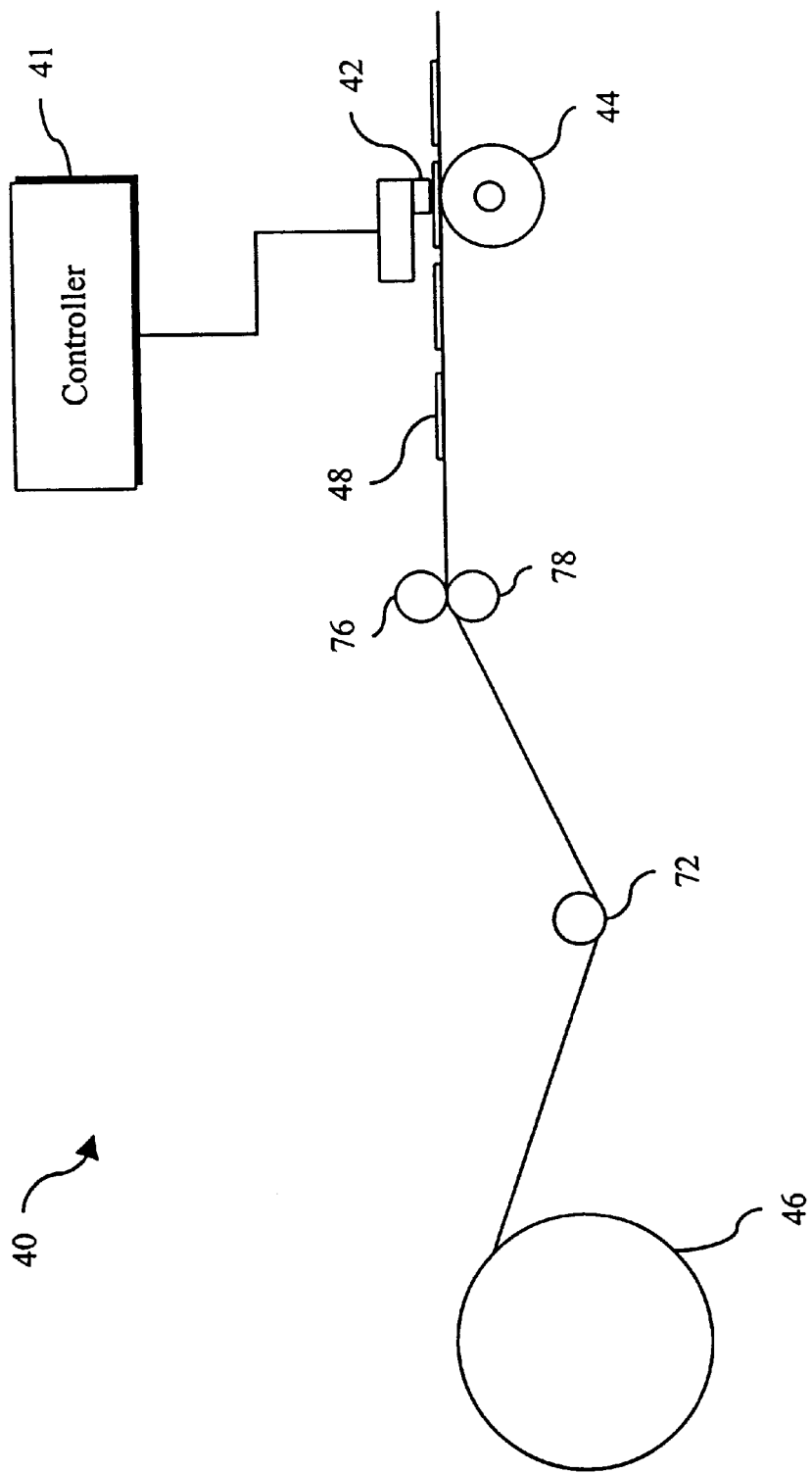
FIG. 5 is another embodiment of the thermal printing unit shown in FIG. 1, having a guide roller positioned to provide a lengthened queue.
Figure 6:
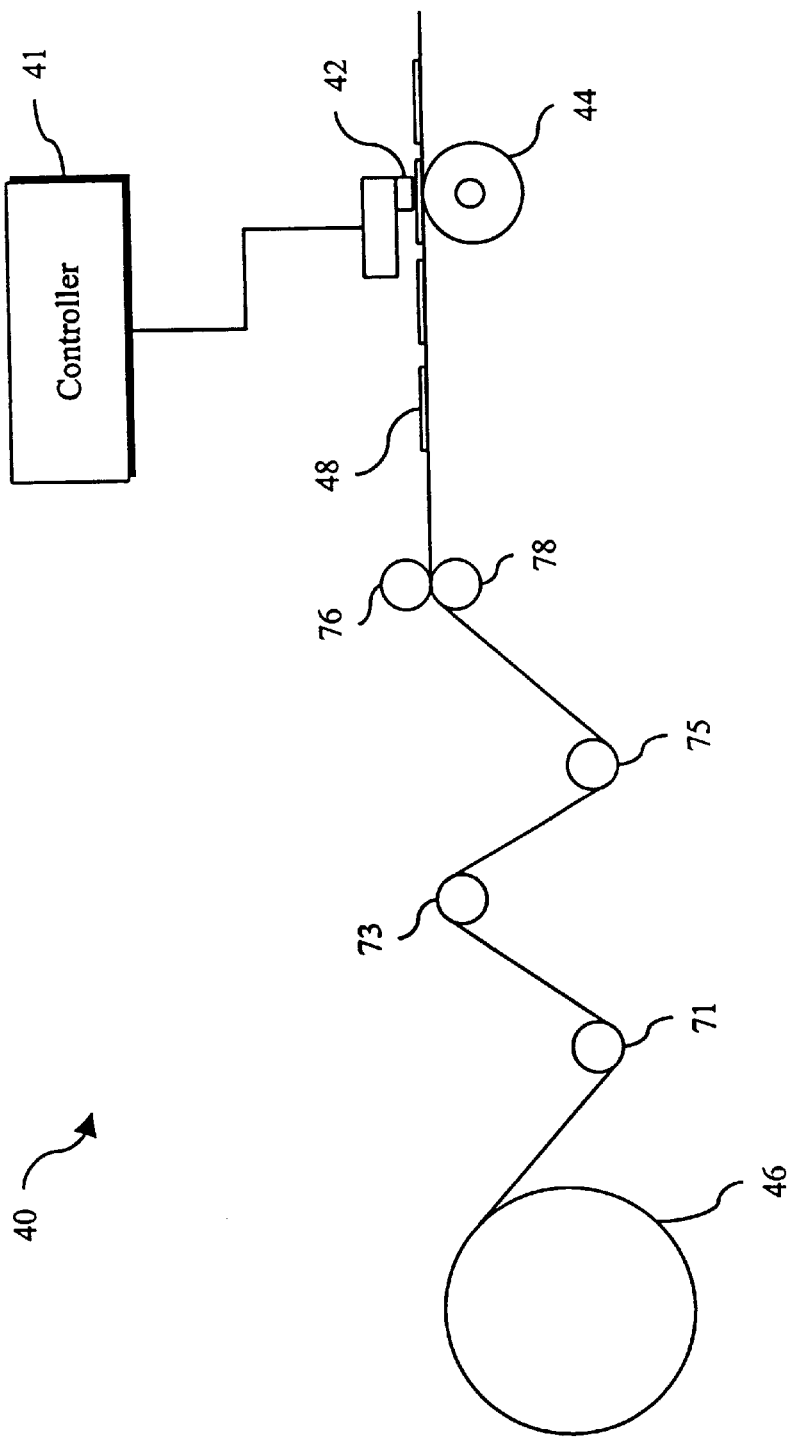
FIG. 6 is the printing unit shown in FIG. 5, with an embodiment of the invention that includes three guide rollers.

Another method of increasing throughput speed of smart labels is to create additional residence time for the RFID tag antenna to be written. This can be accomplished by extending the pathway between the media roll 46 and the print head 42, creating a queue of variable length media. By extending the media pathway, the write length of the smart label is effectively increased, translating to an increase in the overall programming speed. The media queue can be fashioned in a number of ways, either through a variable length loop or an accordion fold arrangement, giving the RFID tag additional time to be encoded while the exterior of a preceding label is at the print head 42. For RFID tag antennas that are short relative to label length, this arrangement also allows the RFID tag antenna to be held stationary for writing while a preceding label is being printed. In one embodiment, the variable length queues can be configured using one or more guide rollers. FIG. 5 shows an embodiment with one guide roller 72 providing an extended length queue, with guide rollers 76 and 78 providing a guide to the print head 42. FIG. 6 shows an alternate embodiment of the variable length queue with three guide rollers 71, 73 and 75, providing an even longer path for additional write time. These concepts are more fully developed in U.S. patent application Ser. No. 09/123,629, filed Jul. 28,1998, and incorporated by reference herein.

Having thus described a preferred embodiment of a performance optimized smart label printer, it should be apparent to those skilled in the art that certain advantages of the within system have been achieved. It should also be appreciated that various modifications, adaptations, and alternative embodiments thereof may be made within the scope and spirit of the present invention. For example, a smart label printer with a thermal printing unit has been illustrated. It should be apparent, however, that the inventive concepts described above would be equally applicable to other types of printing units. Likewise, although an illustration of smart labels with backing was provided, the inventive concepts would be equally applicable to smart labels without backing, or linerless smart labels. The invention is further defined by the following claims.

What is claimed is:

1. A printing system for smart labels, wherein said smart labels comprise outer printing surfaces for printing indicia thereon and embedded RFID tags, comprising:

a printing unit;

a plurality of antennas disposed around said printing unit;

a radio frequency driver sending signals to said antennas for transmission to said RFID tags;

a processor coupled to said printing unit and said radio frequency driver;

a memory coupled to said processor storing data to be sent to said printing unit and said radio frequency driver; and, a non-volatile memory coupled to said processor storing program instructions for controlling said processor, said program instructions comprising the steps of reading said data from said memory; generating a writing signal for said radio frequency driver; and generating a printing signal for said printing unit, said processor commanding operation of said radio frequency driver to encode at least one smart label and said printing unit to print said smart label in response to said data;

wherein a first one of said plurality of antennas broadcasts a carrier wave signal to energize one of said RFID tags and a second one of said plurality of antennas subsequently communicates with said one of said RFID tags.

2. The printing system of claim 1, further comprising an artificial intelligence model coupled to said processor and configured to learn individual RFID tag data characteristics.

3. The printing system of claim 2, wherein said artificial intelligence model comprises a model configured to predict incomplete RFID tag data based upon previous RFID tag data characteristics.

4. The printing system of claim 1, wherein said printing unit further comprises a print head, a controller coupled to said print head sending activation signals, and a media transport mechanism adapted to transport a Print media to said print head, said print media being comprised of individual ones of said labels, and wherein said printing unit further comprises a pathway means for delivering said print media from a print media roll to said print head, wherein said pathway means provides a queue between said print media roll and said print head including a variable length of said print media.

5. The printing system of claim 4, wherein said pathway means further comprises a variable length loop of said print media between said print media roll and said print head.

6. The printing system of claim 4, wherein said pathway means further provides an accordion fold arrangement of said print media between said print media roll and said print head.

7. A printing system for smart labels, wherein said smart labels comprise outer printing surfaces for printing indicia thereon and embedded RFID tags, comprising:
    means for individually programming said RFID tags;
    means for compressing data to be programmed into said RFID tags; and
    means for pre-loading a data range to be programmed into said RFID tags.

8. The printing system of claim 7, wherein said data range comprises fixed data.

9. The printing system of claim 7, further comprising means for predicting missing portions of data sets to be sent to individual RFID tags.

10. The printing system of claim 7, wherein said printing unit further comprises a pathway means for delivering said labels from a label origin to said print head, wherein said pathway means provides a queue between said origin and said print head including a variable length of media.

11. The printing system of claim 10, wherein said pathway means further comprises a variable length loop of media between said origin and said print head.

12. The printing system of claim 10, wherein said pathway means further provides an accordion fold arrangement of media between said origin and said print head.

13. A printing system for smart labels, wherein said smart labels comprise outer printing surfaces for printing indicia thereon and embedded RFID tags, comprising:
    means for individually programming said RFID tags;
    means for prioritizing data to be programmed into said RFID tags; and
    means for pre-loading a data range to be programmed into said RFID tags.

14. The printing system of claim 13, wherein said data range comprises fixed data.

15. The printing system of claim 13, further comprising means for predicting missing portions of data sets to be sent to individual RFID tags.

16. The printing system of claim 13, wherein said printing unit further comprises a pathway means for delivering said labels from a label origin to said print head, wherein said pathway means provides a queue between said origin and said print head including a variable length of media.

17. The printing system of claim 16, wherein said pathway means further comprises a variable length loop of media between said origin and said print head.

18. The printing system of claim 16, wherein said pathway means further provides an accordion fold arrangement of media between said origin and said print head.

19. A method for increasing the speed at which the RFID tag component of a smart label is programmed during a printing operation of said smart label by a printing unit having a print head for printing information onto an exterior portion of said smart label, wherein said printing unit is coupled to a smart label printing system, wherein a plurality of antennas are used to write to said RFID tag, and wherein a pathway is provided for said smart label, said pathway extending between an origin for said smart label and said print head, said method comprising the steps of:
    optimally configuring data to be programmed into said RFID tag by one or more of predicting said data, pre-loading said data, prepending said data, and compressing said data; and
    programming said data into said RFID tag.

20. The method of claim 19, further comprising energizing selected ones of said antennas for sequential programming of said smart label.

21. The method of claim 19, further comprising broadcasting a carrier wave signal to energize an RFID tag with a first of said plurality of antennas and communicating with said RFID tag with a second of said plurality of antennas.

22. The method of claim 19, wherein the step of configuring further comprises predicting variable data, including evaluating said RFID tag data and generating a model based on historical characteristics.

23. The method of claim 22, wherein the step of configuring further comprises comparing predicted variable data programmed into said RFID tag with actual RFID tag data upon receipt.

24. The method of claim 22, wherein the step of configuring further comprises writing said actual RFID tag data to said RFID tag if said predicted data does not match said actual RFID tag data.

25. The method of claim 19, wherein the step of configuring further comprises pre-loading fixed and regularly varying data ranges for said RFID tag data into said smart label printing system.

26. The method of claim 19, wherein the step of configuring further comprises prepending said RFID tag data onto data to be printed on said exterior portion of said smart label.

27. The method of claim 19, wherein the step of configuring further comprises compressing said RFID tag data to a code format with fewer than 8 bits per character.

28. The method of claim 19, wherein said printing unit further comprises a thermal printing unit.

29. A printing system for smart labels, wherein said smart labels comprise external printing surfaces for printing indicia thereon and embedded RFID tags, said system comprising:
    a printing unit;
    at least one antenna disposed near said printing unit, wherein said antenna is configured to broadcast a carrier wave signal to energize said RFID tags;
    a radio frequency driver configured to send signals to said antenna for transmission to said RFID tags;
    a processor coupled to said printing unit and said radio frequency driver;
    a memory coupled to said processor for storing data to be sent to said printing unit and said radio frequency driver;
    wherein said system is operable at selectable times to encode at least one of said smart labels with at least a first portion of said data, and to print said at least one of said smart labels with at least a second portion of said data.

30. The printing system of claim 29, further comprising an artificial intelligence model coupled to said processor and configured to learn individual RFID tag data characteristics.

31. The printing system of claim 30, wherein said artificial intelligence model comprises a model configured to predict incomplete RFID tag data based upon previous RFID tag data characteristics.

32. The printing system of claim 29, wherein said printing unit further comprises a print head, a controller coupled to said print head sending activation signals, and a media transport mechanism adapted to transport a print media to said print head, said print media being comprised of individual ones of said smart labels.

33. The printing system of claim 29, wherein said printing unit further comprises a thermal printing unit.

34. The printing system of claim 32, wherein said printing unit further comprises means for delivering said print media from a print media roll to said print head, wherein said delivering means provides a queue between said print media roll and said print head including a variable length of said print media.

35. The printing system of claim 34, wherein said delivering means further comprises a variable length loop of said print media between said print media roll and said print head.

36. The printing system of claim 34, wherein said delivering means further provides an accordion fold arrangement of said print media between said print media roll and said print head.

37. The printing system of claim 29, further comprising a plurality of antennas, including said at least one antenna, disposed near said printing unit, wherein at least one of said plurality of antennas is configured to broadcast a carrier wave signal to energize said RFID tags.

38. The printing system of claim 37, wherein a first one of said plurality of antennas broadcasts a carrier wave signal to energize ones of said RFID tags and a second one of said plurality of antennas subsequently communicates with said ones of said RFID tags.

39. A printing system for smart labels, wherein said smart labels comprise external printing surfaces for printing indicia thereon and embedded RFID tags, said system comprising:

a printing unit for printing indicia on said smart labels;

transmitting means for transmitting signals to said embedded RFID tags;

a processor coupled to said printing unit and said transmitting means;

speed increasing means for increasing the speed of operation of said system;

wherein said system is operable at selectable times to encode successive ones of said embedded RFID tags with at least a first portion of said data, and to print successive ones of said smart labels with at least a second portion of said data.

40. The printing system of claim 39, wherein said speed increasing means further comprises an artificial intelligence model coupled to said processor and configured to learn individual RFID tag data characteristics.

41. The printing system of claim 40, wherein said artificial intelligence model comprises a model configured to predict incomplete RFID tag data based upon previous RFID tag data characteristics.

42. The printing system of claim 39, wherein said printing unit further comprises a print head, and a media transport mechanism adapted to transport a print media to said print head, and means for delivering said print media from a print media roll to said print head, wherein said delivering means provides a queue between said print media roll and said print head including a variable length of said print media.

43. The printing system of claim 42, wherein said delivering means further comprises a variable length loop of said print media between said print media roll and said print head.

44. The printing system of claim 42, wherein said delivering means further provides an accordion fold arrangement of said print media between said print media roll and said print head.

45. A method for increasing the speed at which the RFID tag component of a smart label is programmed during a printing operation of said smart label by a printing unit having a print head for printing information onto an exterior portion of said smart label, wherein said printing unit is coupled to a smart label printing system, and wherein a plurality of antennas are used to write to said RFID tag, said method comprising the steps of:

configuring data to be programmed into said RFID tag into a plurality of data portions; and sequentially energizing selected ones of said antennas to broadcast to corresponding ones of said plurality of data portions, thereby programming said data into said RFID tag.

* * * * *